United States Patent
Rogers et al.

(10) Patent No.: US 12,327,150 B2
(45) Date of Patent: Jun. 10, 2025

(54) ON-DEVICE PRIVATIZATION OF MULTI-PARTY ATTRIBUTION DATA

(71) Applicant: Microsoft Technology Licensing, LLC, Redmond, WA (US)

(72) Inventors: Ryan M. Rogers, Los Gatos, CA (US); Man Chun D. Leung, Daly City, CA (US); David Pardoe, Mountain View, CA (US); Bing Liu, San Jose, CA (US); Shawn F. Ren, Knoxville, TN (US); Rahul Tandra, Santa Clara, CA (US); Parvez Ahammad, San Jose, CA (US); Jing Wang, Los Altos, CA (US); Ryan T. Tecco, Philadelphia, PA (US); Yajun Wang, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 299 days.

(21) Appl. No.: 17/978,933

(22) Filed: Nov. 1, 2022

(65) Prior Publication Data

US 2024/0143416 A1    May 2, 2024

(51) Int. Cl.
  *G06F 3/00* (2006.01)
  *G06F 9/54* (2006.01)
  *G06F 21/64* (2013.01)
(52) U.S. Cl.
  CPC .............. *G06F 9/54* (2013.01); *G06F 21/645* (2013.01)
(58) Field of Classification Search
  CPC ....................................................... G06F 9/48
  See application file for complete search history.

(56) References Cited

U.S. PATENT DOCUMENTS

| | | | |
|---|---|---|---|
| 2021/0073449 A1* | 3/2021 | Segev | G06F 30/27 |
| 2022/0187847 A1* | 6/2022 | Cella | G06Q 10/06 |
| 2022/0197306 A1* | 6/2022 | Cella | G05B 19/41865 |
| 2022/0303761 A1 | 9/2022 | Mohan | |
| 2022/0318830 A1 | 10/2022 | Liu | |
| 2022/0366494 A1* | 11/2022 | Cella | H04L 9/50 |
| 2023/0123539 A1 | 4/2023 | Trevor | |

(Continued)

OTHER PUBLICATIONS

Marcelo Ferreira, Malicious URL Detection using Machine Learning Algorithms. (Year: 2019).*

(Continued)

*Primary Examiner* — Lechi Truong
(74) *Attorney, Agent, or Firm* — Nicholson De Vos Webster & Elliott LLP

(57) ABSTRACT

Embodiments of the disclosed technologies receive first event data associated with a first party application, receive second event data representing a click, in the first party application, on a link to a third party application, receive third event data from the third party application, convert the third event data to a label, map a compressed format of the labeled third event data to the first event data and the second event data to create multi-party attribution data, group multiple instances of the multi-party attribution data into a batch, add noise to the compressed format of the labeled third event data in the batch, and send the noisy batch to a second computing device. A debiasing algorithm can be applied to the noisy batch. The debiased noisy batch can be used to train at least one machine learning model.

20 Claims, 8 Drawing Sheets

(56) References Cited

U.S. PATENT DOCUMENTS

| | | | |
|---|---|---|---|
| 2023/0239134 A1 | 7/2023 | Salomon | |
| 2023/0269411 A1 | 8/2023 | Senokuchi | |
| 2023/0275876 A1 | 8/2023 | Lebedev et al. | |
| 2023/0297857 A1 | 9/2023 | Roie | |
| 2023/0306473 A1 | 9/2023 | Wang | |
| 2023/0315818 A1 | 10/2023 | Gould | |
| 2023/0334021 A1 | 10/2023 | Brechbuhl | |
| 2023/0351464 A1 | 11/2023 | Beausoleil | |
| 2024/0143416 A1* | 5/2024 | Rogers | G06N 20/00 |

OTHER PUBLICATIONS

"Learning with Privacy at Scale", Retrieved From: https://machinelearning.apple.com/research/learning-with-privacy-at-scale, Dec. 2017, 25 Pages.

Johnson, et al., "FBPCF (Facebook Private Computation Framework)", Retrieved From : https://github.com/facebookresearch/fbpcf?fbclid=IWAR18czHOYDeyS3qdJBUMzT38KMAIGSXUL4elwqWiQZv2Ub9FtAZI7zlogk8, Retrieved Date: Jan. 10, 2022, 11 Pages.

Wang, et al., "Using randomized response for differential privacy preserving data collection", In Proceedings of the Workshops of the EDBT/ICDT Joint Conference, Mar. 15, 2016, 8 Pages.

Warner, Stanleyl. , "Randomized response: A survey technique for eliminating evasive answer bias", In Journal of the American Statistical Association, vol. 60, No. 309, Mar. 1965, 8 Pages.

Mudd, Graham.,"Privacy-Enhancing Technologies and Building for the Future", Retrieved from: https://www.facebook.com/business/news/building-for-the-future, Aug. 11, 2021, 7 Pages.

Notice of Allowance mailed on Feb. 23, 2024, in U.S. Appl. No. 17/681,343, 10 pages.

Kedacic, et al., "Application for Testing of Video and Subtitle Synchronization", IEEE, 2018, pp. 23-27.

Notice of Allowance mailed on Jan. 25, 2024, in U.S. Appl. No. 17/681,343, 11 pages.

Schneider, et al., "The Use of Social News Curation to Empower Citizens and Journalists: Findings of A Focus Group Study with Professional Curators", IEEE, 2021, pp. 1184-1190.

U.S. Appl. No. 17/972,408, filed Oct. 24, 2022.

U.S. Appl. No. 17/681,343, filed Feb. 25, 2022.

* cited by examiner

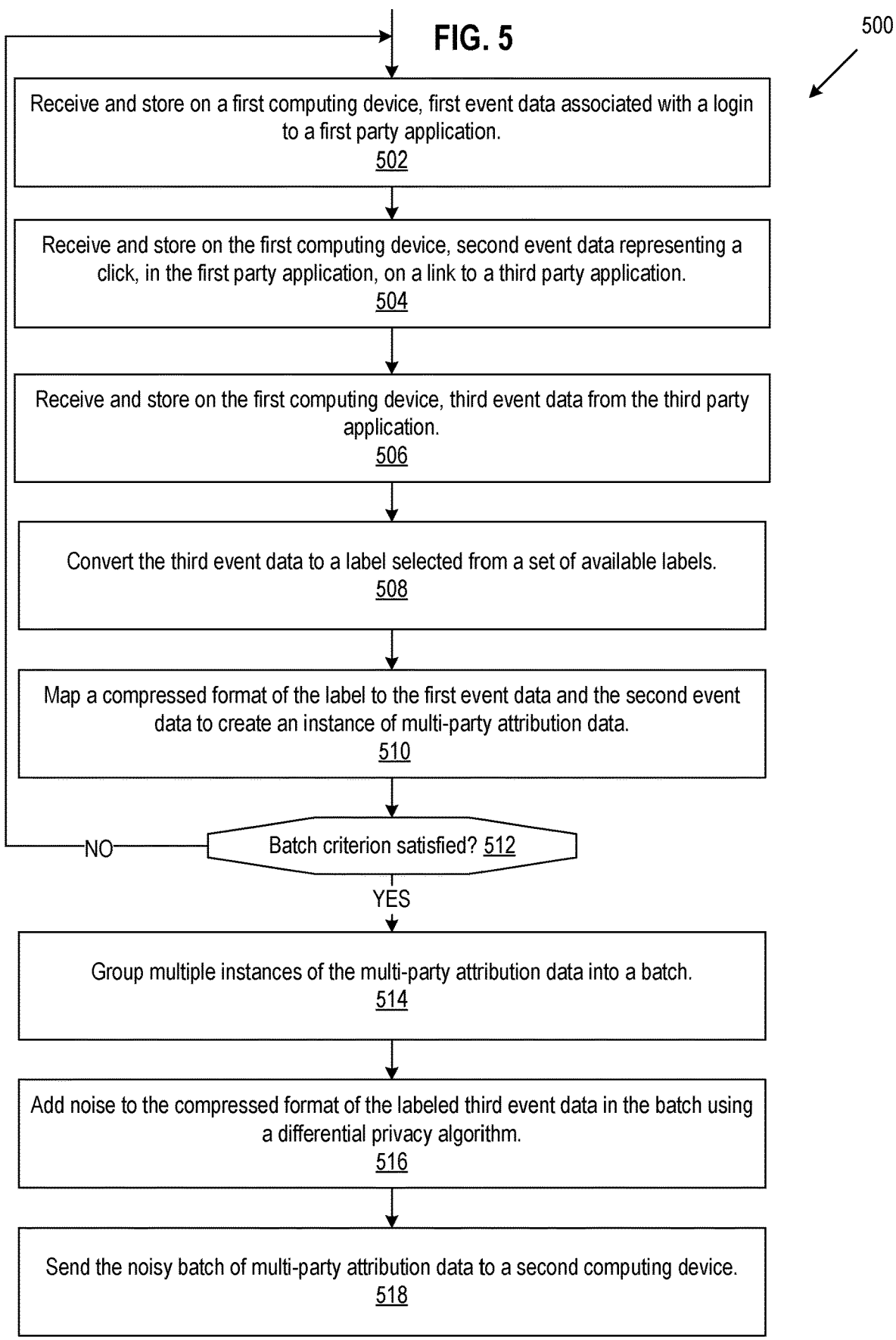

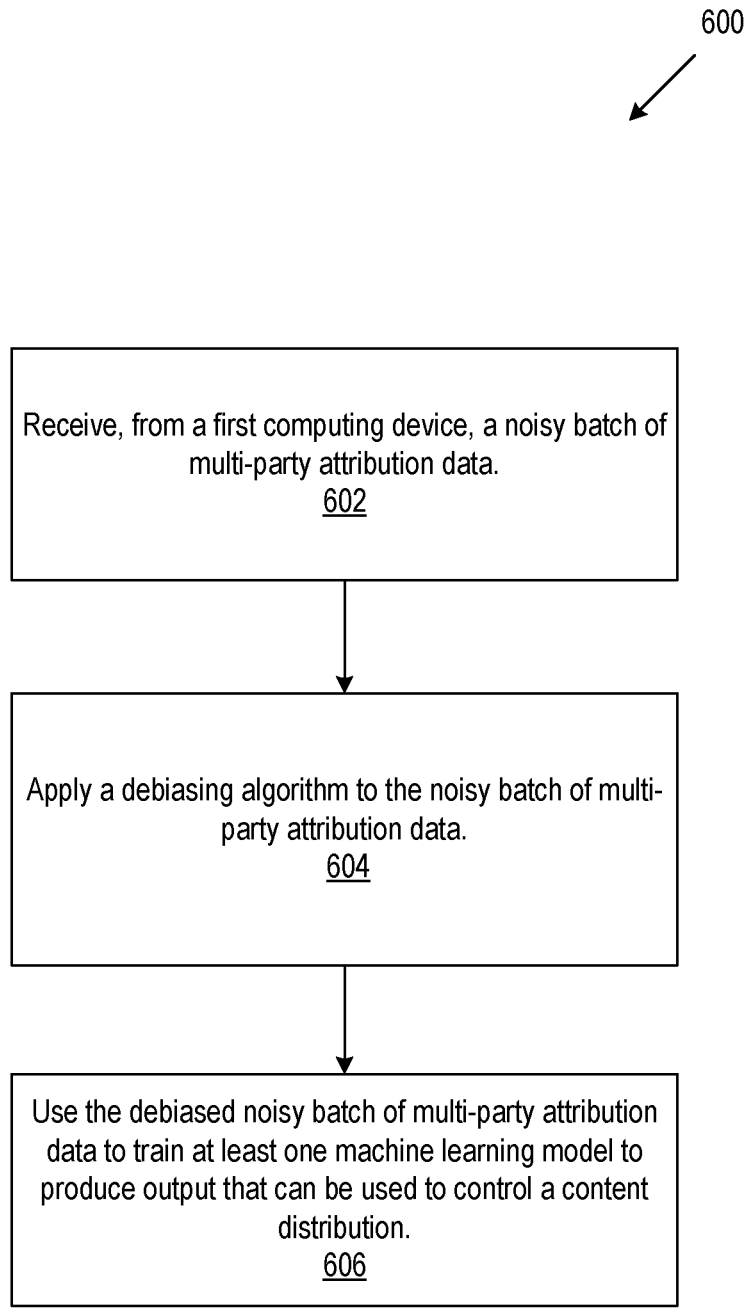

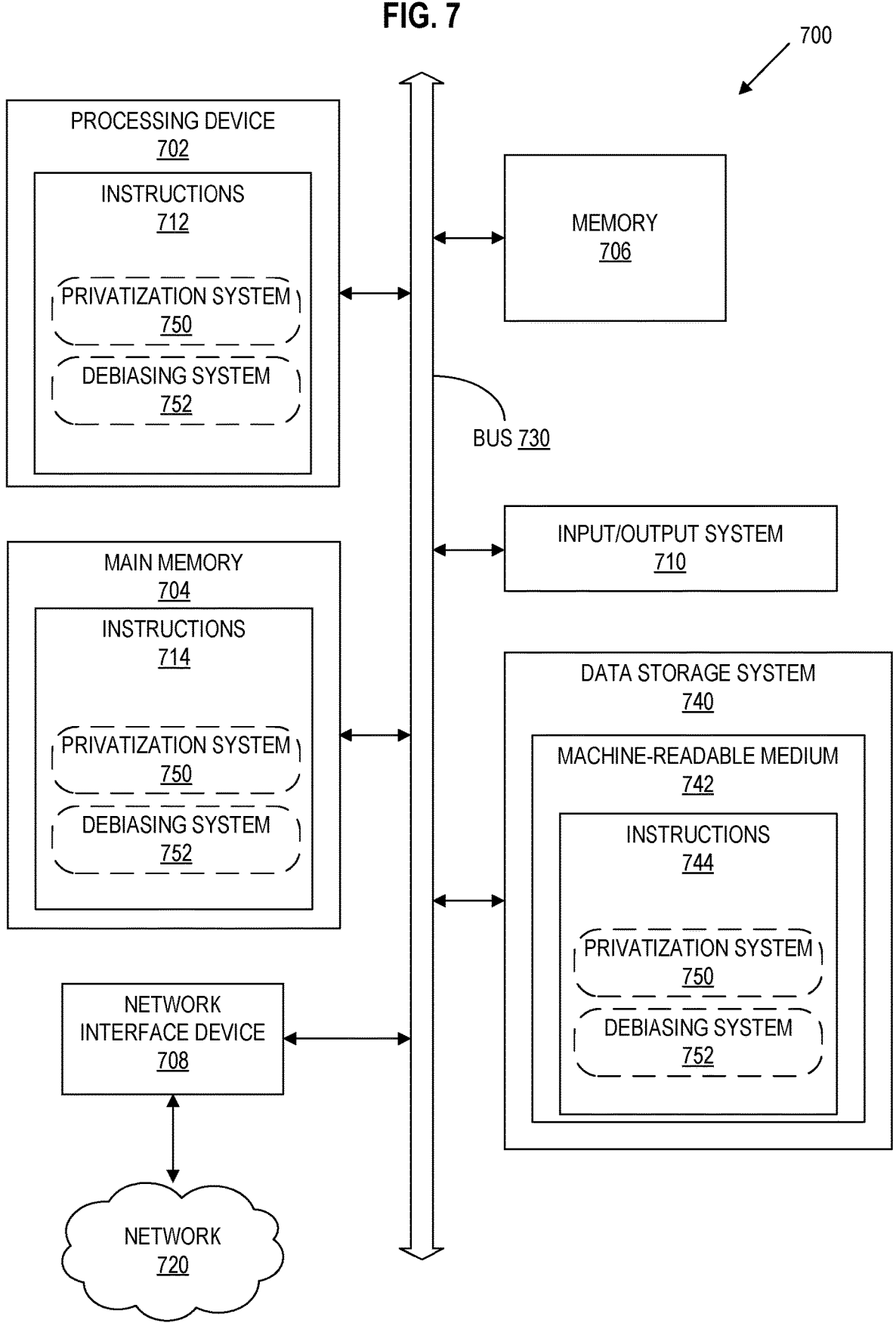

ON-DEVICE PRIVATIZATION OF MULTI-PARTY ATTRIBUTION DATA

TECHNICAL FIELD

A technical field to which the present disclosure relates is data security. Another technical field to which the present disclosure relates is event attribution, including the use of event attribution data to control digital content distribution systems. Another technical field to which the present disclosure relates is machine learning model training, including the training of optimization models.

BACKGROUND

Software applications use computer networks to distribute digital content to user computing devices on a very large scale. Automated content distributions can distribute millions of content items to tens or even hundreds of millions of user devices. The performance of a digital content distribution system can be measured based on events generated at the user devices, such as clicks, conversions, and other user interface events. These measurements can be used to control the operations of the digital content distribution system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a flow diagram of an example method 500 for on-device privatization in accordance with some embodiments of the present disclosure.

FIG. 6 is a flow diagram of an example method 600 for on-device privatization in accordance with some embodiments of the present disclosure.

FIG. 7 is a block diagram of an example computer system in which embodiments of the present disclosure can operate.

DETAILED DESCRIPTION

Figure 1:
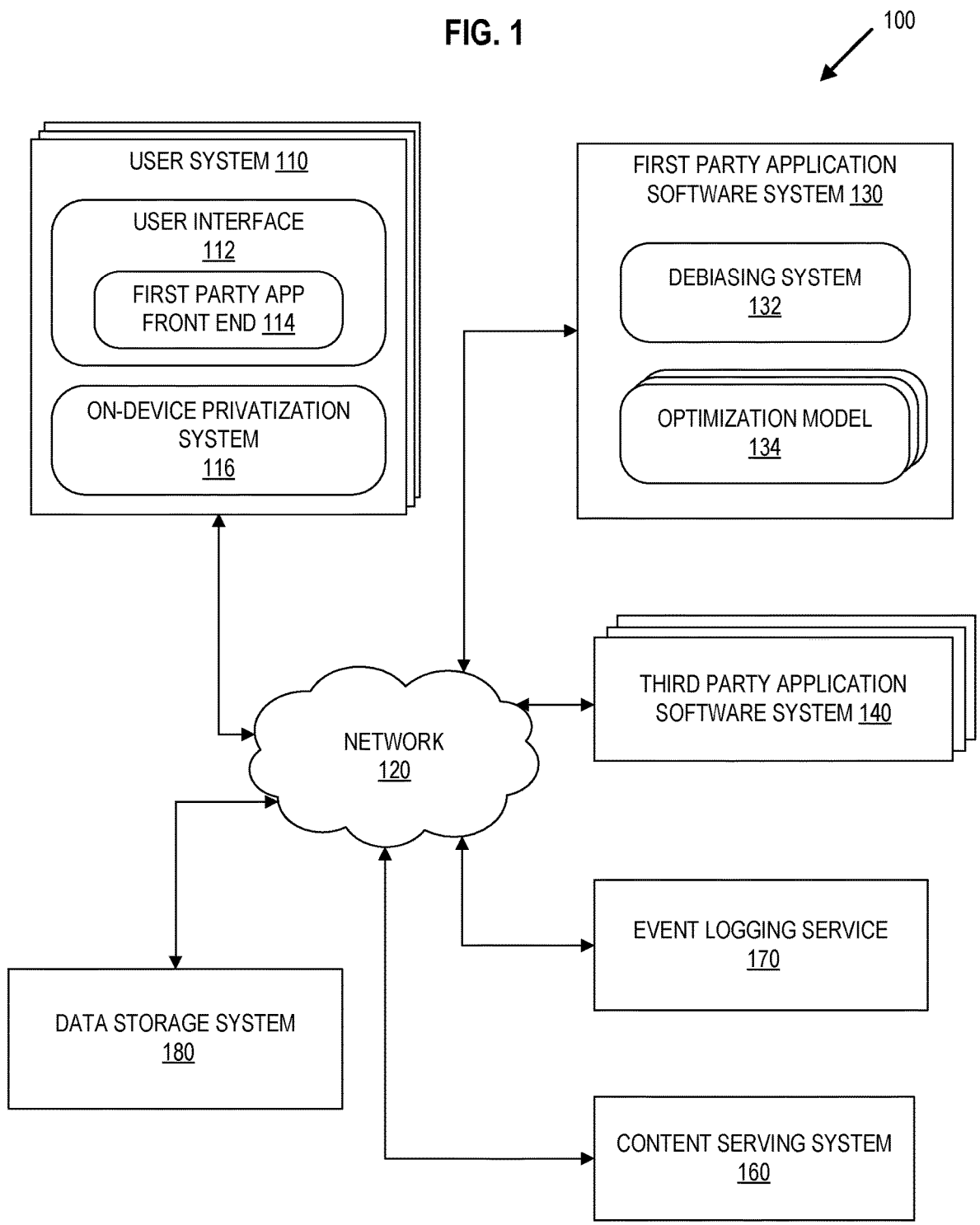
FIG. 1 illustrates an example computing system 100 that includes an on-device privatization component and a debiasing system in accordance with some embodiments of the present disclosure.

Attribution, as used herein, refers to a process of mapping user interface events to semantic labels. The labels can represent different possible outcomes associated with the user interface events. Attribution data can be used to train machine learning models, such as optimization models and ranking models. Machine learning models trained on attribution data can be used to control the operation of digital content distribution systems.

Attribution data is created by an automated process that assigns semantic labels to user interface events. An instance of attribution data includes, for example, at least one event identifier, a content identifier, a label, a timestamp, and perhaps some attribute data associated with the event identifier(s) and/or content identifier. An example of an event identifier is a label that identifies an occurrence of a particular type of online event, such as click or conversion. An example of a content identifier is a label that identifies a particular digital content item or a particular content distribution, such as a campaign identifier, that is associated with a particular click or conversion event. Examples of attribution labels include binary values that indicate click or no click, or conversion or no conversion. For instance, a positive label may be assigned to a click with a conversion, and a negative label may be assigned to a click without a conversion.

Click as used herein may refer to any action taken by a user with an input device that causes a signal to be received and processed by the user's device, including mouse clicks, taps on touchscreen display elements, voice commands, haptic inputs, and/or other forms of user input. Conversion as used herein may refer to an array or sequence of clicks, and not to a single click. The array or sequence of clicks is filtered by timestamp to determine the last, e.g., most recent, click (the "last touch click"), and the last touch click is used as the signal of a conversion or no conversion.

In other examples, the attribution labels indicate different types of click events or conversion events. For instance, a first conversion label might indicate that a user completed an online form or didn't complete the form, and a second conversion label may indicate that the user completed an online purchase or didn't complete the purchase. Whether a user interface event or a sequence of user interface events constitutes a click event or a conversion event is determined based on a set of rules that are configured according to the requirements of a particular implementation. The set of rules can be defined by a particular third party app, for instance. As an example, a click on a "purchase now" button could be defined as a conversion event for one third party app while a sequence of clicks in different fields of an online form might be a conversion event for a different third party app. Also, a single click can belong to multiple different conversions, and the same click may be a conversion according to one rule but not a conversion for another rule.

Access to certain portions of attribution data can be restricted. For example, rules, policies, or user preferences may prohibit certain user data from being shared across applications and/or devices.

Aspects of the present disclosure are directed to providing security for access-restricted portions of multi-party attribution data while at the same time enabling the secure data to be used to train machine learning models such as optimization models and ranking models.

Attribution data is multi-party when different portions of the attribution data are produced by different sources. For example, a first portion of the attribution data is received at a user's computing device from a first source and a second portion of the attribution data is received at the same user's computing device from a different source. A first portion of the attribution data can include, for instance, identifier data, such as a user identifier, a session identifier, a network address, or a group identifier, which is received by a front end portion of a first party application running on the user's computing device. Another portion of the attribution data can include, for example, user interface event data received by the front end portion of the first party application from a third party application.

Multi-party attribution data is created, for example, when a user opens and logs in to a first party application (app) on the user's mobile device, clicks or taps on a graphical user interface (GUI) element in the first party app that causes the first party app to traverse a link (e.g., a Uniform Resource Locator or URL) to a third party app, and takes some action in the third party app that causes a user interface event in the third party app to be reported by the third party app to the first party app. In this scenario, the multi-party attribution data could include first event data, which includes an identifier associated with the user's login to the first party app, second event data associated with the user's click on the GUI element in the first party app, and third event data associated with the user's action in the third party app. Either or both the first party app and the third party app can be software applications through which content distributions can be delivered to end users.

Combinations of the first event data, second event data, and third event data can be useful for training optimization models and/or ranking models that control digital content distributions. For example, the multi-party attribution data can be used to train an optimization model to generate output that quantifies the likelihood of a particular user completing a conversion event for a particular content distribution. The optimization model output can be in the form of a predicted conversion rate, a score, or a bid price to be input to a real-time bidding (RTB) system, for example. The machine learning models and their respective training processes are often managed by server computers such as back end portions of the first party app.

However, access by the first party app to certain data received at the user's device from a third party app may be restricted to the user's device. As a result, it is a technical challenge to combine attribution data received from two or more different sources in a secure manner so that the combined data can be used for server-side machine learning model training without revealing the access-restricted data.

Data security, also referred to herein as privatization, can be achieved, for example, by obfuscating data elements that are subject to access restrictions. Differential privacy algorithms can be used to obfuscate access-restricted data. It is another technical challenge to apply obfuscation methods such as differential privacy to multi-party attribution data on a resource-constrained device such as a user's smart phone or other mobile device in a scalable manner.

This disclosure provides technical solutions to the above-described challenges and other shortcomings of prior methods. For example, when combining attribution data from multiple sources, the disclosed technologies leave data received from one source unobfuscated and use differential privacy to obfuscate data received from another source. For instance, the disclosed technologies leave individual identity data unobfuscated while obfuscating user interface event data. To enable the secure data combination on resource-constrained devices, the data to be privatized is compressed into a bit format and obfuscation is applied to the compressed format.

In some implementations, the compressed format for each potential conversion event is represented by a single bit (e.g., a bit value of one indicates a conversion and a bit value of zero indicates no conversion). In other implementations, each potential conversion event is represented by a set of bits (e.g., each bit indicates a different type of conversion and the bit value of a particular bit indicates whether a particular conversion type has occurred or not occurred).

The compressed event data is batched at the user's device and the differential privacy algorithm is applied to the batch of conversion events at the user's device. For ease of discussion, conversion event as used herein refers to potential conversion events, i.e., a user interface event or series of user interface events that each may constitute a conversion event or not constitute a conversion event. For example, a batch of conversion events may include conversion events and other events that are not conversion events.

The differential privacy algorithm obfuscates the conversion event data by adding noise to the compressed format of the event labels. The output of the differential privacy algorithm is capable of being sent off of the user's device in a secure manner because any party who receives the output, including the server side of the first party app, will be unable to determine with certainty whether any given conversion event label is the actual true label or a falsified label (which is not the actual true label because noise has been added). As such, the user device can provide the noisy event data to a server. For example, the noisy event data can be used by the back end of the first party app for machine learning model training and/or other downstream operations that control digital content distributions.

Prior data security approaches have focused on obfuscating the user's identity information and do not obfuscate event data. In contrast with these prior approaches, the disclosed technologies obfuscate the access-restricted event data of a user while leaving the user's identity information unobfuscated.

In some prior data security approaches, group labels are used in place of individual identity information, such that a user's event data are associated with a group label rather than the user's individual identifier. Examples of group labels are attribute values that multiple different users typically have in common, such as job title=software engineer or location=San Francisco Bay Area. Because the group label obscures the individual user's identity, these prior approaches do not use additional obfuscation techniques (other than the group label).

The disclosed approaches can be used either with group labels or individual identifiers. Additionally, the disclosed approaches can be used in scenarios in which group label approaches cannot be used as effectively. For instance, the disclosed approaches can be used in scenarios that do not require the use of group labels. An example of such a scenario is where the user is logged into a front end of a first party application on the user's device and the desired machine learning model training is performed by a back end portion of the same first party application. The back end of the first party application has access to the user's login information by virtue of the user's login to the first party app. In the disclosed approaches, if the user clicks to a third party app from within the first party app, the event data received by the first party app from the third party app is obfuscated before it is sent off of the user's device but the user's login information remains unobfuscated.

As described in more detail below, differential privacy is used to add noise to the third event data at the user's device, when the third event data is received on the user's device and combined with the corresponding first event data. On the user's device and/or at a server that receives the noisy multi-party attribution data, at least one debiasing system de-biases the noisy multi-party attribution data to prepare the data to be used for machine learning model training. In this way, the disclosed technologies enable user-level multi-party attribution data to be used for machine learning model training without having to convert the individual identifying information to a group label. As a result, the quality of the training data is improved because it is more granular (e.g., contains user-specific attribute and event data) than group-level training data, which contains only coarse features such as group-level or aggregate attribute and event data. The improved granularity of the training data, in turn, improves the quality of the output produced by the machine learning models. The improved quality of the machine learning model output, in turn, improves the effectiveness of the content distribution system.

The disclosed technologies provide two different privacy approaches: a first approach that uses differential privacy to obfuscate the true conversion labels received from the third party, to ensure user deniability as to whether a conversion occurred or not, and a second approach that determines a final conversion label based on a combination of a differentially private conversion label and additional aggregated first event data such as overall conversion rate for a campaign. For example, in the first approach, the differentially private conversion labels are obfuscated versions of the true conversion labels (i.e., could be the true value or a falsified value).

In the second approach, there may be aggregated conversion rate data for a particular campaign, so these aggregates can be to determine the rate at which the true conversion and non-conversion bit values should be flipped for each user, while still ensuring differential privacy for the conversion of each user, given the aggregates. Deniability as used here refers to an event-level privacy guarantee, where there is deniability for the conversion label for each (click, label) pair. This is different from a user-level privacy guarantee, which would apply to only a few (click, conversion label) pairs from the user device.

The disclosed technologies also provide multiple debiasing approaches. In one approach, a server-side debiasing system debiases noisy multi-party attribution data received from the user device. The server-side debiasing system can include a generalized debiaser, multiple different debiasers that are each configured for use with a different differential privacy algorithm or a different machine learning model, or a combination of both a generalized debiaser and multiple different specific debiasers. Alternatively or in addition, the debiasing system can include a client-side debiaser. For example, a debiaser can be implemented on-device as part of the on-device privatization system or as a separate component of the user system.

Conversion data is an example of a performance measurement or metric that can help improve the usability and effectiveness of content distribution systems for both the end users and the providers of digital content items. For instance, conversion data can be included in or converted to features used to train and/or fine tune a machine learning model of a content serving pipeline, or for improving an automated process of selecting content items for distribution. The output produced by the trained machine learning model can directly or indirectly control the downstream flow of digital content items to user devices. For instance, the machine learning model may select a content item for displaying to a particular user's device based on an estimated conversion rate that the machine learning model has computed for that user as a result of the machine learning model having been trained on user-level conversion rate training data generated using the techniques described herein. While this disclosure describes examples that refer to conversion data, specifically, the described techniques can be applied to other types of performance measurements or metrics, as well.

The disclosed technologies are described in the context of online network-based digital content distribution. An example of a content distribution use case is the distribution of digital advertisements for products and/or services through an online social network. However, aspects of the disclosed technologies are not limited to ads distribution, but can be used to improve content distributions more generally. Also, any network-based application software system can act as a content distribution system. For example, news, entertainment, and e-commerce apps installed on mobile devices, messaging systems, and social graph-based applications can all function as content distribution systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes an on-device privatization system and at least one debiasing system in accordance with some embodiments of the present disclosure.

In the embodiment of FIG. 1, computing system 100 includes a user system 110, a network 120, a first party application software system 130, a third party application software system 140, a content serving system 160, an event logging service 170, and a data storage system 180. User system 110 includes an on-device privatization system 116, and first party application software system 130 includes at least one debiasing system 132 and at least one machine learning model 134.

As described in more detail below, on-device privatization system 116 adds noise to third event data received at user system 110, debiasing system 132 prepares noisy multi-party attribution data for use by machine learning models such as optimization model 134, and optimization model 134 is trained, using debiased noisy multi-party attribution data produced by on-device privatization system 116 and debiasing system 132, to output inferential data such as estimated conversion rates, scores, and other values, which are used to control a digital content distribution system. In some configurations, both on-device privatization system 116 and debiasing system 132 reside locally on user system 110. In other configurations, debiasing system 132 resides on a server of first party application software system 130. Some configurations include multiple different debiasing systems 132 that are each configured according to the input requirements of a particular differential privacy algorithm or optimization model.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion 114 of first party application software system 130 and/or a front-end portion of third party application software system 140. For example, embodiments of user interface 112 include a graphical display screen that includes at least one slot. A slot as used herein refers to a space on a graphical display such as a web page or mobile device screen, into which digital content may be loaded during a content distribution. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 is any type of user interface as described above. User interface 112 can be used to input data, initiate user interface events, and view or otherwise perceive output that includes data produced by first party application software system 130 or third party application software system 140. For example, user interface 112 can include a graphical user interface and/or a conversational voice/speech interface that includes a mechanism for logging in to first party application software system 140, clicking or tapping on GUI elements, and interacting with digital content items of content distributions. Examples of user interface 112 include web browsers, command line interfaces, and mobile app front ends. User interface 112 as used herein can include application programming interfaces (APIs).

First party application software system 130 is any type of application software system that provides or enables at least one form of digital content distribution to user systems such as user system 110. Examples of first party application software system 130 include but are not limited to connections network software, such as social media platforms, and systems that are or are not be based on connections network software, such as general-purpose search engines, job search software, recruiter search software, sales assistance software, content distribution software, learning and education software, or any combination of any of the foregoing.

First party application as used herein may refer to a software application that is considered the owner of particular data or that has been granted permission by a user to use certain data. For example, an application that requires users to agree to a set of terms and conditions regarding data security may be considered a first party application with respect to data created as a result of the users' use of the first party application.

Third party application software system 140 is any type of application software system that provides or enables at least one form of digital content distribution to user systems. Examples of third party application software system 140 include but are not limited to any type of networked software application including mobile apps such as social media platforms, news, entertainment, and e-commerce apps, messaging apps, search engines, or any combination of any of the foregoing.

Third party application as used herein may refer to a software application that is different than first party application 130 in terms of its publisher, platform, or other considerations. A third party application may refer to a software application that is considered the owner of particular data or that has been granted permission by a user to use certain data, which is not the first party application 130. For example, an application that requires users to agree to a set of terms and conditions regarding data security may be considered a third party application with respect to data created as a result of the users' use of the third party application. Certain data owned or used by a third party application 140 is not owned by the first party application 130 and the first party application 130 may not have been granted the same permission to use that data as the third party application.

Content serving system 160 is a data storage service, such as a web server, which stores digital content items that may be included in a content distribution and delivers digital content items to, for example, web sites and mobile apps or to particular slots of web sites or mobile app user interface display screens. In some embodiments, content serving system 160 processes content distribution requests from, for example, first party application software system 130 or third party application system 140, and distributes digital content items to user systems 110 in response to content distribution requests. A content distribution request is, for example, a network message such as an HTTP (HyperText Transfer Protocol) request for data that occurs in connection with an event such as a click or a page load. Content distribution requests include request metadata, including an identifier (ID) that may uniquely identify the source of the request (e.g., a user account identifier, a device identifier, a session identifier, etc.). In some implementations, content serving system 160 is part of first party application software system 130.

Event logging service 170 captures user interface events such as page loads and clicks in real time, and formulates the user interface events into a data stream that can be consumed by, for example, a stream processing system. For example, when a user of first party application system 130 or third party application system 140 clicks on a user interface element such as a content item, a link, or a control such as a view, comment, share, or reaction button, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred.

Time as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes. Real-time means, for example that the time delay between two events, or between an event and feedback, is not perceptible to the user or falls within a range of latency values that is acceptable to the user. For most users, a real-time latency value is in the range of milliseconds or less than one second. For some users, a real-time latency value is up to about three seconds.

Data storage system 180 includes data stores and/or data services that store digital content items, data received, used, manipulated, and produced by first party application software system 130 and/or third party application system 140. Alternatively or in addition, data storage system 180 includes data stores and/or data services that store data received, used, manipulated, and produced by on-device privatization system 116, debiasing system 132, or optimization model 134, including aggregated event data and inferential data. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, first party application software system 130, third party application software system 140, content serving system 160, event logging service 170, and data storage system 180 includes an interface embodied as computer programming code stored in computer memory that when executed causes a computing device to enable bidirectional communication with any other of user system 110, first party application software system 130, third party application software system 140, content serving system 160, event logging service 170, and data storage system 180 using a communicative coupling mechanism. Examples of communicative coupling mechanisms include network interfaces, inter-process communication (IPC) interfaces and application program interfaces (APIs).

A client portion of first party application software system 130 and/or third party application software system 140 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running first party application software system 130 and/or a server portion of first party application software system 130 can receive the input, perform at least one operation using the input, and return output using an HTTP response that the web browser receives and processes.

Each of user system 110, first party application software system 130, third party application software system 140, content serving system 160, event logging service 170, and data storage system 180 is implemented using at least one computing device that is communicatively coupled to electronic communications network 120. Any of user system 110, first party application software system 130, third party application software system 140, content serving system 160, event logging service 170, and data storage system 180 can be bidirectionally communicatively coupled by network 120. User system 110 as well as other different user systems (not shown) can be bidirectionally communicatively coupled to first party application software system 130.

A typical user of user system 110 can be an administrator or end user of first party application software system 130, third party application software system 140, and/or content serving system 160. User system 110 is configured to communicate bidirectionally with any of first party application software system 130, third party application software system 140, and/or content serving system 160 over network 120.

The features and functionality of user system 110, first party application software system 130, third party application software system 140, content serving system 160, event logging service 170, and data storage system 180 are implemented using computer software, hardware, or software and hardware, and can include combinations of automated functionality, data structures, and digital data, which are represented schematically in the figures. User system 110, first party application software system 130, third party application software system 140, content serving system 160, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

For ease of discussion, in FIG. 7, the on-device privatization system 116 is represented as privatization system 750 and the debiasing system 132 is represented as debiasing system 752. On-device privatization system 750 and debiasing system 752 are each implemented as instructions stored in a memory, and a processing device 702 can be configured to execute the instructions stored in the memory to perform the operations described herein. While FIG. 7 shows both on-device privatization system 750 and debiasing system 752 as part of computer system 700, on-device privatization system 750 and debiasing system 752 are implemented on different computer systems or across multiple computer systems, in other implementations.

The disclosed technologies can be described with reference to an example use case of digital content distribution involving a social graph-based application such as a professional social network application. The disclosed technologies are not limited to use in connection with social graph applications but can be used to provide data security for content distribution systems more generally. The disclosed technologies can be employed by many different types of network-based applications in which content distribution is used, including but not limited to various types and forms of application software systems.

Further details with regard to the operations of the on-device privatization system 116 and debiasing system 132 are described below.

Figure 2:
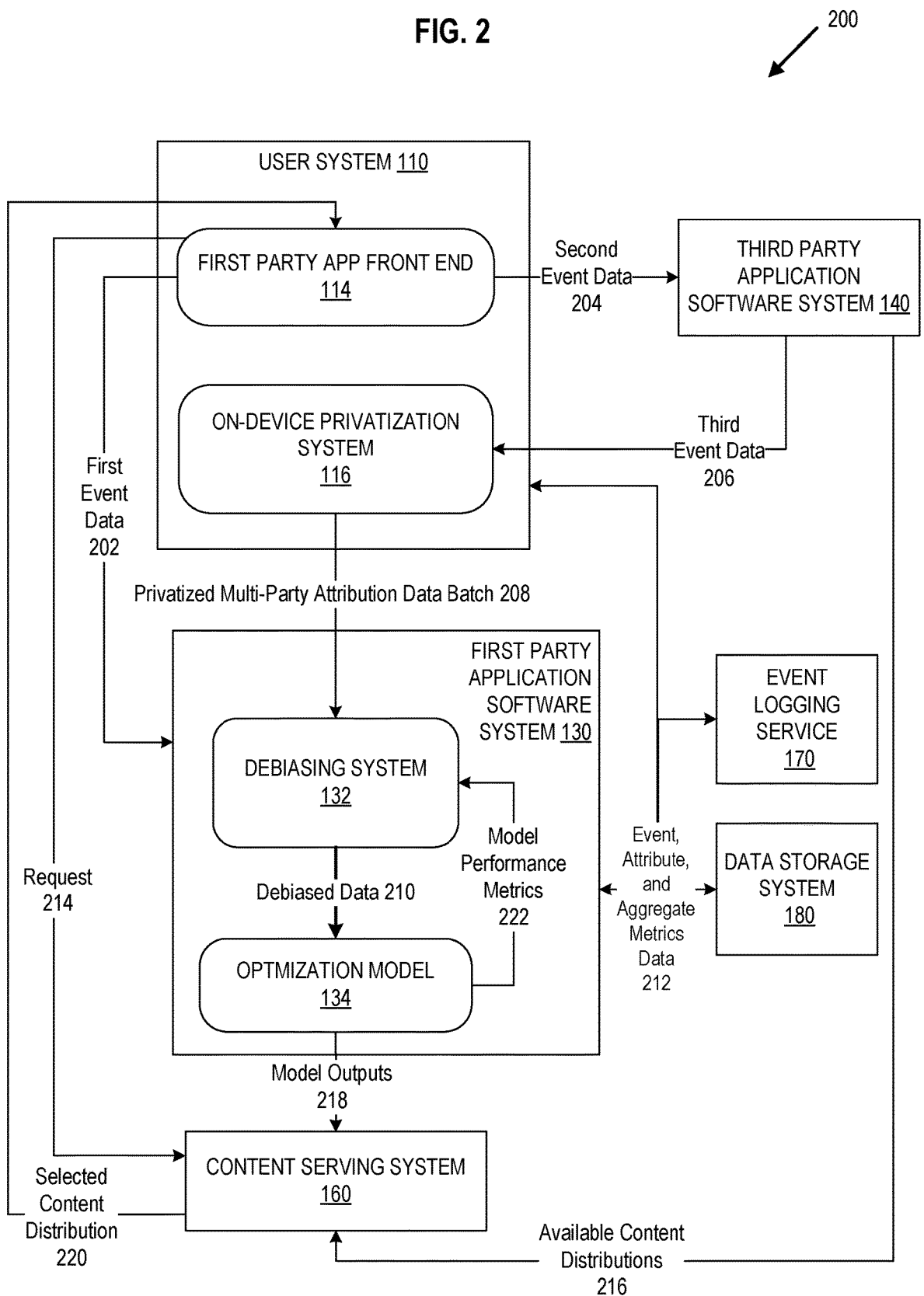
FIG. 2 is a flow diagram of an example method 200 for on-device privatization in accordance with some embodiments of the present disclosure.

FIG. 2 is a flow diagram of an example method 200 for on-device privatization in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the on-device privatization system 116 and/or debiasing system 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

Figure 3:
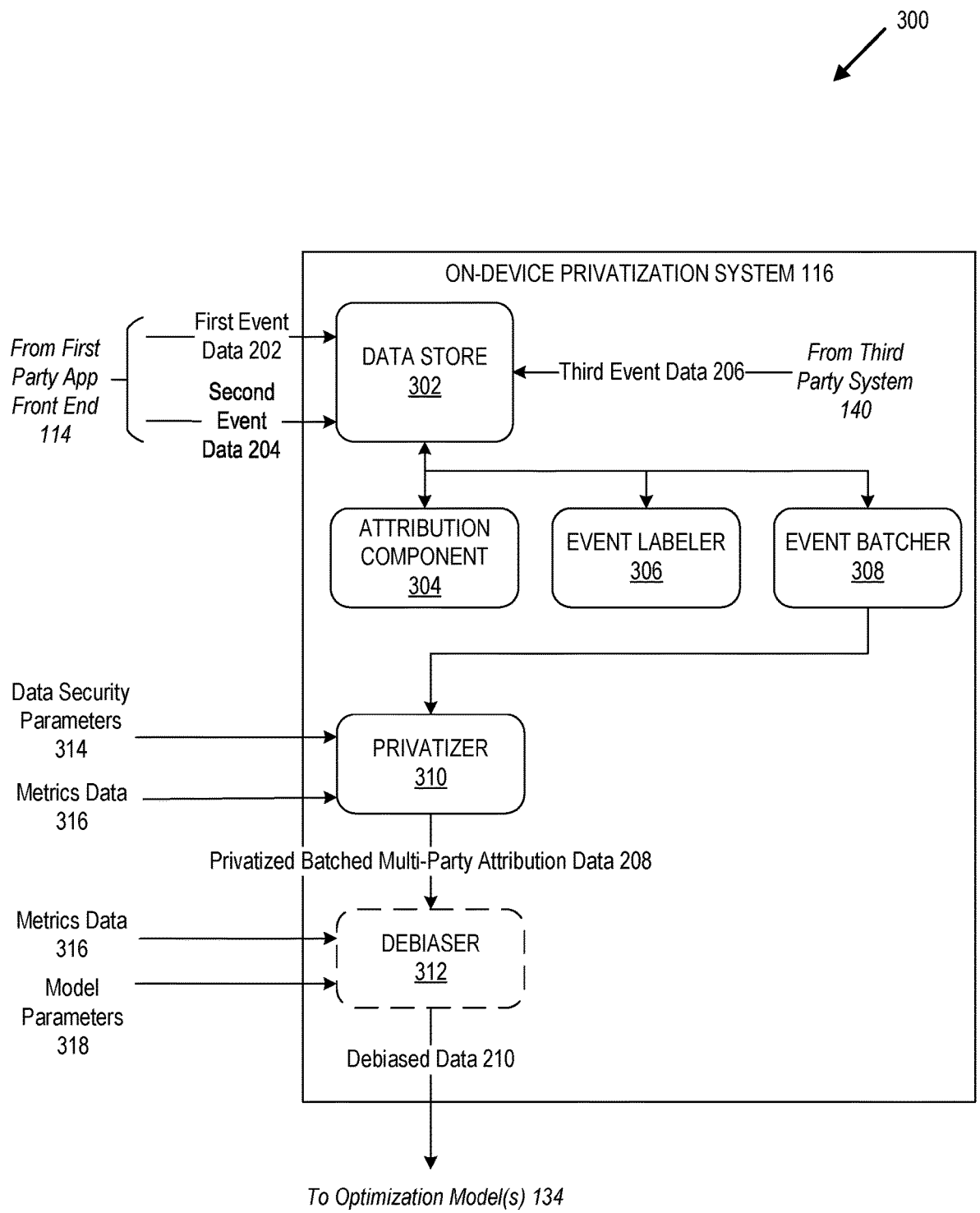
FIG. 3 is a flow diagram of an example method 300 to implement on-device privatization in accordance with some embodiments of the present disclosure.

As shown in FIG. 2, the method 200 includes communications between different components of computing system 100, including on-device privatization system 116, debiasing system 132, and optimization model 134, in the context of a content distribution. Additional details of on-device privatization system 116 are shown in FIG. 3, described below.

In the embodiment of FIG. 2, first party app front end 114 communicates first event data 202 to first party application software system 130. First event data 202 includes, for example, individual identifying information associated with a user login to first party application software system 130 through first party app front end 114 at user system 110. Individual identifying information includes, for example, an application user identifier (ID), a session ID, device ID, a network address, or a combination of any of the foregoing, but does not include group labels. However, in some embodiments, first event data 202 includes group labels alternatively or in addition to individual identifying information.

User interface 112, or more specifically, first party app front end 114, communicates second event data 204 to third party application software system 140. Second event data 204 includes, for example, a click on a link displayed on a web page of first party app front end 114, where traversing the link loads a content item or a web page of third party application software system 140 into user interface 112.

Third party application software system 140 communicates third event data 206 to on-device privatization system 116. Third event data 206 includes, for example, a stream of at least one user interface event occurring in third party application software system 140 in response to second event data 204. For instance, third event data 206 can include user clicks on content items and/or GUI elements displayed in user interface 112 by third party application software system 140, or inputs into fields of online forms of third party application software system 140 displayed in user interface 112. In some implementations, third event data 206 that is communicated to on-device privatization system 116 includes only conversion events. In other implementations, third event data 206 includes a mix of conversion events and other kinds of user interface events.

As described in more detail below, on-device privatization system 116 stores first event data 202, second event data 204, and third event data 206 locally on user system 112, and processes the data 202, 204, 206 to produce a privatized multi-party attribution data batch 208. An instance of privatized multi-party attribution data contained in the batch 208 includes, for example, true, unobfuscated first event data 202 and an obfuscated version of third event data 206. In some embodiments, privatized multi-party attribution data also includes second event data 204 in an unobfuscated form. The batch 208 contains multiple instances of multi-party attribution data created over a time interval. For example, the batch 208 can include instances of privatized multi-party attribution data that are conversion events that occurred within the time interval and instances of privatized multi-party attribution data that are events that occurred within the time interval but are not conversion events.

The length of the time interval used to create batch 208 is configured according to the requirements of a particular design or implementation. For example, the time interval could be 24 hours, or more or less than 24 hours, depending on the hardware or software configuration of user system 110, the current state of network 120, the level of in-app activity of the user, or other considerations. The event data collected in the batch 208 all pertains to the same individual identity; i.e., all instances of event data in the batch 208 correspond to the same individual identifier. For instance, the time interval may be less than 24 hours if the user is a heavy user of first party application software system 130 or more than 24 hours if the user is an infrequent user.

In the illustrated implementation, on-device privatization system 116 communicates the privatized multi-party attribution data batch 208 to debiasing system 132. In other implementations, where the privatized multi-party attribution data is used for purposes other than machine learning model training, debiasing system 132 is optional or omitted.

In the example of FIG. 2, debiasing system 132 is part of a back end portion of first party application software system 130. In other implementations, debiasing system 132 is part of on-device privatization system 116 or is a separate component of user system 110. Debiasing system 132 applies at least one corrective technique to the privatized multi-party attribution data batch 208, such as removing some of the conversions to ensure that the aggregate number of conversions matches group level data or aggregated conversion data received from other channels, to produce debiased data 210. Examples of debiasing techniques that may be used by debiasing system 132 are described in more detail below with reference to FIG. 3.

Debiasing system 132 communicates debiased data 210 to optimization model 134. During a training phase, a training function of optimization model 134 uses debiased data 210 to train optimization model 134 to machine-learn correlations between various combinations of user-level event data and various possible model outputs. A validation function of optimization model 134 iterates the training process until a desired degree of confidence in the model outputs is achieved. The confidence level is configurable according to the requirements of a particular design or implementation.

In an operational phase, when content serving system 160 receives a request 214 from user system 110, the trained optimization model 134 generates model outputs 218 in response to the request 214. For example, model 134 computes an estimated conversion rate for a particular user-content distribution combination with, e.g., a 90% confidence. The optimization model 134 further computes a ranking score or a value, such as an RTB price, based on the estimated conversion rate, in some implementations.

In the operation phase, model outputs 218 are used by content serving system 160 to select a content distribution 220 to be served to user system 110 in response to request 214. The selected content distribution 220 is selected from a set of available content distributions 216 provided to content serving system 160 by at least one third party application software system 140. Whereas in a similar scenario the optimization model output of prior systems is limited to group-level outputs, here the model outputs 218 can be computed at the user level instead of the group level because, using the described on-device privatization and debiasing approaches, the model 134 can be securely trained on user-level training data.

In some implementations, a monitoring function of optimization model 134 monitors the performance of optimization model 134 during the operational phase to, for example, measure the difference between true conversion rates and conversion rates estimated by the model 134. The performance monitoring function of optimization model 134 generates model performance metrics 222 and communicates model performance metrics 222 to debiasing system 132 in a feedback loop. Debiasing system incorporates model performance metrics 222 into its debiasing processes. For example, if model performance metrics 222 indicate that conversion rate estimates produced by model 134 vary significantly from true conversion rates, where the true conversion rate data may be received from other channels based on group level and aggregated conversion data, debiasing system 132 can alter its debiasing technique to remove instances of noisy data from the model training.

In some implementations, debiasing system 132 and/or optimization model 134 use as inputs to their respective processes event, attribute, and aggregate metrics data 212 maintained by, for example, data storage system 180. For example, the training function of optimization model 134 can combine first party user-level event and attribute data stored in data storage system 180 with the debiased data 210 and use the combined data to train the model 134.

As another example, aggregate metrics data computed by an offline process and stored in data storage system 180, such as aggregate true conversion rate data, can be used by optimization model 134 to compute model performance metrics 222. Alternatively or in addition, aggregate metrics data, such as aggregate true conversion rate data, can be used by debiasing system 132 to configure the debiasing algorithm used. For instance, debiasing system 132 can use aggregate metrics data to determine how much to increase or decrease the amount of noisy data removed from the privatized multi-party attribution data batch 208 to create debiased data 210. In some implementations, portions of the aggregate metrics data 212 are communicated to on-device privatization system 116 and used by a debiasing component of the on-device privatization system 116 to create debiased data 210 on-device.

FIG. 3 is a flow diagram of an example method 300 to implement on-device privatization in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the on-device privatization system 116 and/or debiasing system 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 3, on-device privatization system 116 receives first event data 202 from first party app front end 114 and stores first event data 202 in data store 302. On-device privatization system 116 receives second event data 204 from first party app front end 114 and stores second event data 204 in data store 302. On-device privatization system 116 receives third event data 206 from third party application software system 140 and stores third event data 206 in data store 302. Data store 302 is a secure data store implemented using, for instance, a secure lightweight database, table, tree, or other suitable data structure.

In the embodiment of FIG. 3, on-device privatization system 116 includes an attribution component 304, an event labeler 306, an event batcher 308, a privatizer 310, and, optionally, a debiaser 312. Debiaser 312 can be implemented as part of on-device privatization system 116, as a separate component of user system 110, or as a back end component of the first party application software system 130, e.g., as a component of debiasing system 132.

Attribution component 304 maps third event data 206 to the corresponding first event data 202 and second event data 204. To match third event data 206 with the corresponding second event data 206, attribution component 304 uses predefined page matching mechanisms, such as URL (Uniform Resource Locator)-based matching, image pixel-based matching, or indirect matching, for example.

In some implementations, attribution component 304 compares timestamp data associated with each of first event data 202, second event data 204, and third event data 206 and groups instances of first event data 202, second event data 204, and third event data 206 based on temporal proximity. Attribution component 304 creates multiple linkages of first party data, second party data, and third party data to generate permutations.

In an example of an attribution, using a URL-based match rule as determined by the second party data, multiple permutations of the first event data 202 are paired with the third event data 206. For example, many different instances of first event data 202 can be paired to a single instance of third event data 206, or a single instance of first event data 202 can be paired to multiple different instances of third event data 206, in a many-to-many association. Such pairing can indicate which of the user's clicks in the first party app front end 114 gave rise to a particular instance of the third event data 206 in the third party application software system 140.

Continuing the example, the pairing for the same unique third event data 206 is run through attribution methodologies which apply different weights based on attribution models such as last touch, first touch, linear, etc. In a first touch model, only the first pair based on temporal timestamp for a unique third event data 206 is given 100% of the credit, while the other pairs are given 0%, meaning only the first instance of first event data 202 having the earliest timestamp is considered to have led to the third party event 206. In a last touch model, only the most recent pair based on temporal timestamp for a unique third event data 206 is given 100% of the credit, while the other pairs are given 0%, meaning only the most recent first event data 202 is considered to have led to the third party event 206. In a linear model, each of the touch points (e.g., clicks) of first event data 202 are given the same amount of weight (i.e., 1/n, where n is the number of touch points for that conversion), meaning that the influence of each first party event is weighted equally towards the third party event 206. Permutations with zero weights are dropped. Only permutations with non-zero weights are kept and ranked, and typically only the highest weighted pairs are included as part of the output of the attribution component 304, i.e., the multi-party attribution data. An instance of the multi-party attribution data includes the first event data 202, the second event data 204, and the third event data 206.

Event labeler 306 evaluates and labels the third event data 206 of each instance of multi-party attribution data produced by attribution component 304. For example, event labeler 306 evaluates the third event data 206 of each instance of multi-party attribution data using a rules engine and/or pattern matching algorithm, and applies semantic labels to the third event data 206 based on the output of the rules engine and/or pattern matching algorithm. In some implementations, event labeler 306 contains a rules engine that includes logic for determining whether an instance of third event data 206 is to be labeled as a conversion event or not a conversion event. Event labeler 306 assigns a default value of no conversion event to the instance of third event data 206 and then changes the default value if the output of the rules engine indicates a conversion event, in some implementations.

Event labeler 306 transforms the assigned event labels to a compressed format. For example, event labeler 306 transforms a label of "conversion" to a bit value of 1 and converts a label of "no conversion" to a bit value of 0. In implementations that have a multi-bit compressed format representing multiple different event types, event labeler 306 follows a similar process of assigning an appropriate bit value to each event type. In some implementations, the labeling and compressing steps are combined such that event labeler 306 applies the appropriate bit value as the label without performing a separate step of transforming an uncompressed label to a bit value. Event labeler 306 adds the compressed label to the instance of third event data 206. For example, after processing by event labeler 306, an instance of multi-party attribution data includes an additional field or column that contains the compressed label value.

Event batcher 308 creates a batch of multi-party attribution data that includes multiple instances of multi-party attribution data that have occurred over a given time interval. By batching the multi-party attribution data on-device, event batcher 308 delays the privatization and sending off-device of the noisy multi-party attribution data to ensure that the multi-party attribution data is privatized and sent off-device in a secure manner. Event batcher 308 enables the sending of multi-party attribution data off device that includes both conversions and non-conversions occurring in a given time interval, so that it is not discoverable by the recipient (e.g., a server) of the multi-party attribution data whether data are noisy (fake) conversions or true conversions. Without event batcher 308, for example if conversion data were not sent off device in a batch but rather each time a conversion event occurs, then even with privatization the true conversion data would be discoverable by the recipient because the sending of the event off device would mean that that event was associated with a true conversion at that time.

When users are logged in, the application servers receive the click data for clicks that have occurred during the user session. Using this data, the servers insert the corresponding conversion label for each click occurring in a given time interval associated with a batch.

Privatizer 310 introduces noise to the third event data 206 to ensure deniability for the user's individual conversion data such that other parties who may gain access to the user's conversion data will not be able to tell whether the conversion data is true or noisy. In the illustrated implementation, privatizer 310 is applied to the batched multi-party attribution data. In other implementations (not shown), privatizer 310 is applied to the multi-party attribution data output by the event labeler 306, and then the privatized data produced by privatizer 310 is batched by event batcher 308.

Privatizer 310 applies a differential privacy algorithm to the multi-party attribution data produced by either event labeler 306 or event batcher 308 (either before or after batching). The differential privacy algorithm used by privatizer 310 ensures local differential privacy (LDP). Local differential privacy is a model of differential privacy in which, even if an adversary has access to an individual user's event data stored in a database, that adversary will not be able to learn about any of the user's personal data with certainty that may also be stored in the database.

In one approach, privatizer 310 determines whether to modify, e.g., by adding noise or obfuscation, the value of a particular instance of compressed third event data 206 independently of making the same determination for other instances of the compressed third event data 206 in the batch. For example, privatizer 310 determines whether to add noise by flipping the bit value (from 0 to 1 or from 1 to 0) of each instance independently of the other instances of the compressed third event data 206 in the batch. The output of the differential privacy algorithm is used by privatizer 310 to determine whether to flip the bit or not in a given instance. Examples of differential privacy algorithms are described in more detail below.

In another approach, privatizer 310 uses metrics data 316, such as aggregate true conversion rate data, to determine whether to add noise to a given conversion label (e.g., an instance of compressed third event data 206). In this approach, the metrics data 316 has been previously compiled offline at the group level by, e.g., a server of the back end of first party application 130, and stored in data storage system 180. In this case, the back end server transmits the metrics data 316 to the on-device privatizer 310.

In either approach, privatizer 310 obtains data security parameters 314 from, e.g., a back end portion of first party application 130. Data security parameters 314 include parameter values used to configure the differential privacy algorithm. The exact values of data security parameters 314 are configurable according to the requirements of a particular design or implementation. As an example, epsilon, $\epsilon$, is a differential privacy parameter the value of which may be included in data security parameters 314. Increasing the value of $\epsilon$ reduces the level of obfuscation and thus decreases the level of privacy, and decreasing the value of $\epsilon$ increases the level of obfuscation and thus increases the level of privacy. Here, $\epsilon$ is an event-level or per-event privacy parameter. In some implementations, $\epsilon=4.0$.

Another data security parameter 314 is a batch criterion. Examples of batch criteria include the time delay used by event batcher 308 to determine how often to generate batches of multi-party attribution data, and the number of instances (or records) of privatized multi-party attribution data that can be included in a batch that is transmitted off-device, e.g., to a server of first party application software system 130. The batch criterion ensures that data is not sent off-device until it has been appropriately privatized.

In some implementations, privatizer 310 uses a randomized response algorithm to implement plausible deniability (e.g., differential privacy). In these implementations, noise is added randomly to the third event data 206 to ensure that the user's individual user interface event data (e.g., click and conversion patterns) received from third party application software system 140 remain private.

In some implementations, every click in the stream of user interface event data received from third party application software system 140 is considered a potential conversion, and privatizer 310 applies the differential privacy algorithm to each click. This approach is used when the on-device privatization system 116 does not have access to the last touch click information. After privatization, the last touch algorithm can be applied on the server side and clicks that are not last touch clicks can be discarded or ignored.

In implementations in which privatizer 310 use the randomized response algorithm to privatize a binary outcome, the algorithm M: $\{0,1\} \to \{0,1\}$ operates on a bit b where:

$M(b)=b$ with probability $p=e^{\epsilon}/(1+e^{\epsilon})$, where e is a mathematical constant and $\epsilon$ is the differential privacy parameter described above; otherwise
$M(b)=1-b$ The above algorithm is $\epsilon$-DP. In the above equations, 1-p is the probability that the bit value is changed (is not the true value). This probability corresponds to deniability for the user for each conversion label because if the true input is 1 (did convert) the probability that the observed (obfuscated) label is not 1 is 1-p. Similarily, if the true input is 0 (did not convert) the probability that the observed (obfuscated) label is 1 is 1-p. The probability p that the bit value is not the true value increases as the value of E decreases.

In some implementations, privatizer 310 uses a randomized response algorithm with Laplace noise, which adds Laplace noise, with scale parameter $1/\epsilon$, to the bit $b \in \{0,1\}$ and applies a threshold $x \in [0,1]$, so that if the noisy result is above a threshold x, then the returned bit is 1 and otherwise is 0. Put more simply, the randomized response algorithm with Laplace noise algorithm M: $\{0,1\} \to \{0,1\}$ operates on a bit b with the parameter $x \in [0,1]$ so that:

$M(1)=1$ with probability $p_x=1-\frac{1}{2} \exp(\epsilon(x-1))$, where $\epsilon$ is the differential privacy parameter described above;
$M(1)=0$ with probability $1-p_x$
$M(0)=0$ with probability $q_x=1-\frac{1}{2} \exp(-\epsilon x)$,
$M(0)=1$ with probability $1-q_x$ In the above algorithm, $p_x$ is the probability that a true conversion remains unchanged (kept as a conversion) and $q_x$ is the probability that a true non-conversion remains unchanged (kept as a non-conversion). The above algorithm is $\epsilon$-DP for any value of x. The value of the parameter x is selected to ensure that the expected conversion rate after privatization is the same as the aggregate true conversion rate obtained from, e.g., metrics data 316. For example, using $\epsilon=4.0$, without Laplace noise, the randomized response algorithm adds noise in a manner that increases the conversion rate from 3% (the aggregate true conversion rate obtained from metrics data 316) to 4.88% (the conversion rate computed with noisy data). However, using Laplace noise with $x=0.93$, the expected conversion rate after privatization remains at 3%. To achieve the desired expected conversion rate, debiaser 312 selectively removes more 1's than 0's from the noisy data to reduce the number of false positives and to ensure that the conversion rate is in line with the corresponding true aggregated conversion rate.

Figure 4A:
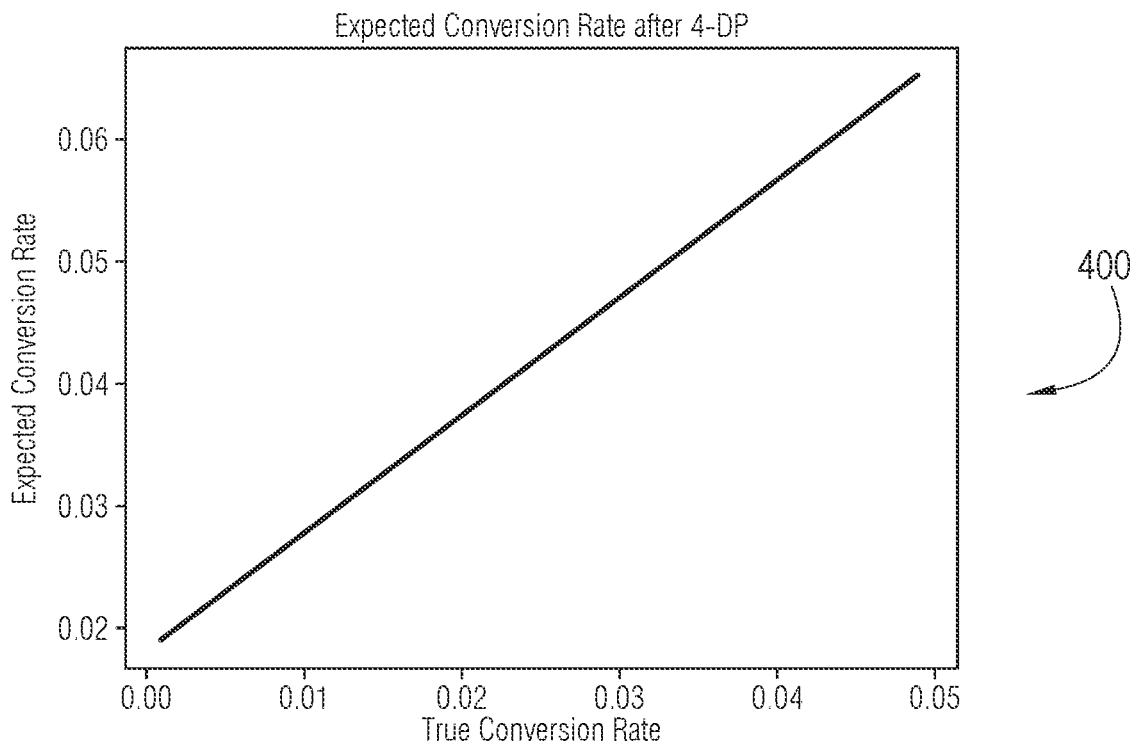
FIG. 4A is an example of a plot of conversion rate data that may be obtained in experiments conducted in accordance with some embodiments of the present disclosure.

Applying the differential privacy algorithm may bias the conversion data (e.g., the batched compressed third event data 206) For example, after differential privacy is applied, the expected conversion rate for content distributions the user has seen might be higher or lower than the true aggregate conversion rate across the user's group. FIG. 4A is an example of a plot of conversion rate data for content distributions that the user has seen, which may be obtained by experimentation in accordance with some embodiments of the present disclosure. In FIG. 4A, the expected conversion rate is plotted after using the randomized response algorithm with $\epsilon=4.0$ and varying the true aggregate conversion rate. As shown in FIG. 4A, the expected conversion rate increases linearly with the changes in the true conversion rate. For example, for a true conversion rate of 1%, the expected conversion rate after differential privacy with $\epsilon=4.0$ is more than 2%, or more than 100% larger.

Because the application of differential privacy can bias the data, debiaser 312 applies a debiasing algorithm to the privatized batched multi-party attribution data 208 output by privatizer 310 to produce debiased data 210. Debiaser 312 is configured according to the particular differential privacy algorithm used by privatizer 310 on-device. For example, debiaser 312 obtains or computes metrics data 316 such as the aggregate probability 1-p of false positives, discussed above, and uses the probability p to determine how to debias the privatized data to make corrections. Alternatively or in addition, debiaser 312 is configured according to the particular model parameters 318 of a particular optimization model 134. After processing by debiaser 312, the debiased data 210 is available for use by at least one optimization model 134 as described above.

Figure 4B:
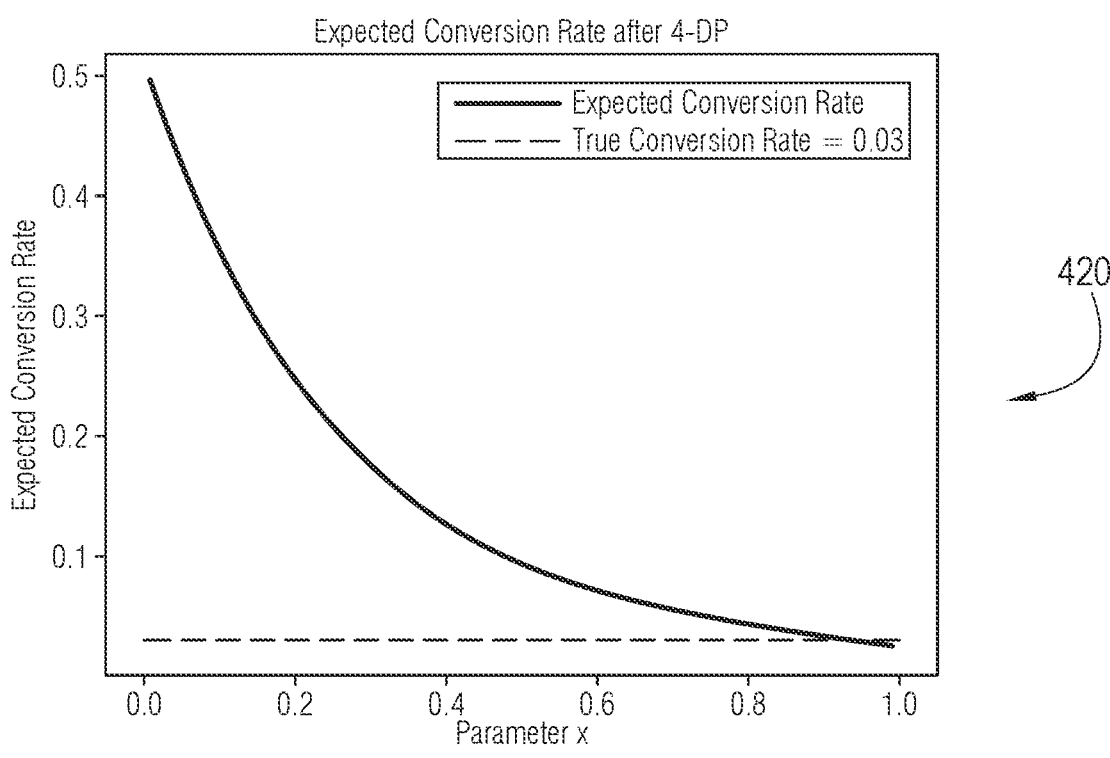
FIG. 4B an example of a plot of conversion rate data that may be obtained in experiments conducted in accordance with some embodiments of the present disclosure.
Figure 4C:
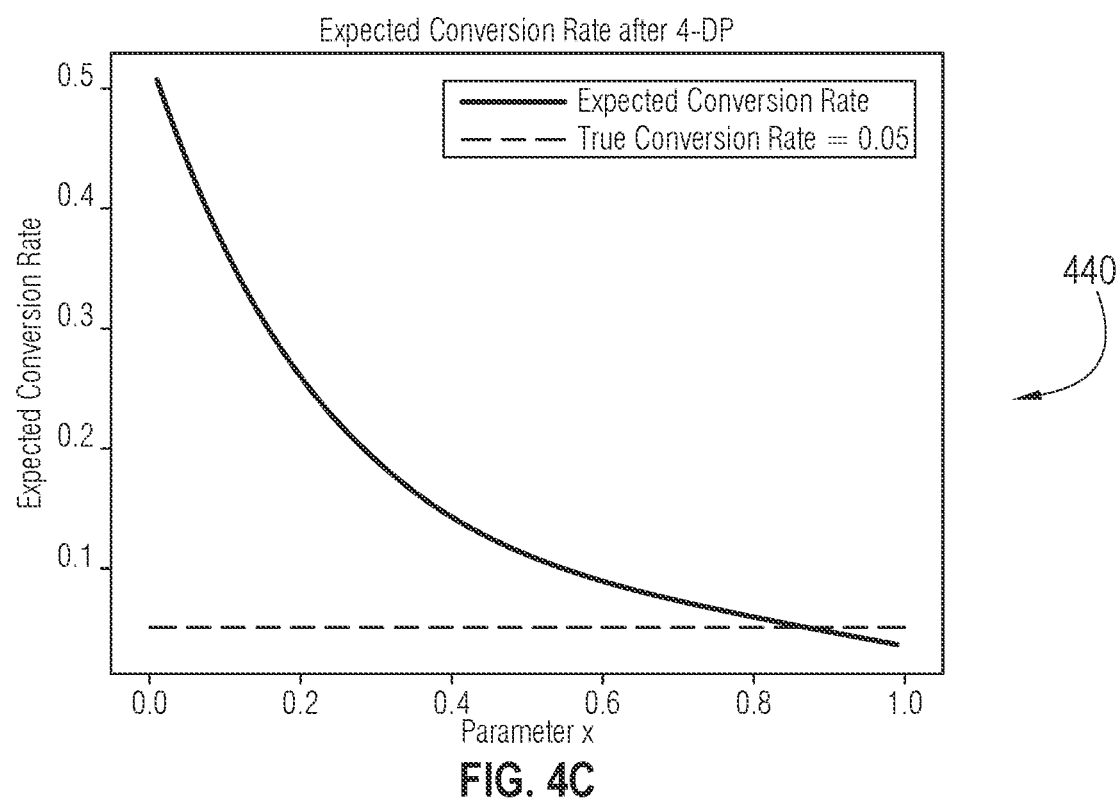
FIG. 4C an example of a plot of conversion rate data that may be obtained in experiments conducted in accordance with some embodiments of the present disclosure.

In some implementations, debiaser 312 incorporates attribute data such as job title or location, generates conversion estimates for each attribute value and then applies a correction to the conversion estimates for at least one of the attribute values. For instance, if a particular content distribution has an aggregate conversion rate of 3%, the job titles of users receiving the content distribution include 10% chefs and 90% software engineers, and 80% of the chefs convert but only 10% of the software engineers convert, debiaser 312 could reduce the noise in the conversion data for the chefs and increase the noise in the conversion data for the software engineers. FIG. 4B and FIG. 4C illustrate examples of how changing the value of x impacts the expected conversion rate after privatization with the Laplace based approach, for two different true conversion rates. In FIG. 4B, the true conversion rate is 0.03, while in FIG. 4C, the true conversion rate is 0.05. The intersection of the two curves, expected conversion rate and true conversion rate, determines the value of x. For a conversion rate of 0.03, FIG. 4B shows that the value of x should be set to approximately 0.9. FIG. 4C shows that the value of x should be less than 0.9 for the conversion rate of 0.05.

The true conversion rate can be approximated using a pre-determined global conversion rate (for example, a typical conversion rate for an individual, group, campaign, or content distribution). Alternatively, the true conversion rate can be computed at a back end server of application software system 130 based on group-level aggregate conversion data, and passed to the on-device privatization system 116. In some implementations, a two-phase privatization approach uses randomized response without Laplace noise to send the privatized conversion data to the back end of application software system 130. At the back end, the conversion data privatized with randomized response can be debiased to get an estimated conversion rate for a particular content distribution, and then the estimated conversion rate can be sent back to the on-device privatization system 116 and used to determine the value of x on-device.

FIG. 5 is a flow diagram of an example method 500 for on-device privatization in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the on-device privatization system 116 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 502, the processing device receives and stores, on a first computing device, first event data associated with a user login to a first party application. Operation 502 is performed by first party app front end 114, described above with reference to FIG. 1 and FIG. 2, or by on-device privatization system 116, described above with reference to FIG. 1, FIG. 2, and FIG. 3, in some implementations. The first event data can include an identifier associated with the user's use of the first party application.

At operation 504, the processing device receives and stores, on the first computing device, second event data representing a click, in the first party application, on a link to a third party application. Operation 504 is performed by first party app front end 114, described above with reference to FIG. 1 and FIG. 2, or by on-device privatization system 116, described above with reference to FIG. 1, FIG. 2, and FIG. 3, in some implementations.

At operation 506, the processing device receives third event data from the third party application. Operation 506 is performed by first party app front end 114, described above with reference to FIG. 1 and FIG. 2, or by on-device privatization system 116, described above with reference to FIG. 1, FIG. 2, and FIG. 3, in some implementations. The third event data can indicate whether or not a conversion occurred in the third party application in response to the click on the link to the third party application.

At operation 508, the processing device converts the third event data to a label selected from a set of available labels. In some implementations, the label is represented by a compressed format comprising at least one bit. Operation 508 is performed by on-device privatization system 116, described above with reference to FIG. 1, FIG. 2, and FIG. 3, or by event labeler 306, described above with reference to FIG. 3, in some implementations.

Converting the third event data to a label can include mapping the third event data to a 1 bit value when the third event data indicates that a conversion occurred in the third party application in response to the click on the link to the third party application and mapping the third event data to a 0 bit value when the third event data does not indicate that the conversion occurred. Alternatively, converting the third event data to a label can include mapping the third event data to a first bit when the third event data indicates that a conversion of a first type occurred in the third party application in response to the click on the link to the third party application and mapping the third event data to a second bit different from the first bit when the third event data indicates that a conversion of a second type different from the first type occurred in the third party application in response to the click on the link to the third party application.

At operation 510, the processing device maps a compressed format of the label applied to the third event data in operation 508 to the first event data and the second event data to create an instance of multi-party attribution data. Operation 510 stores the instance of multi-party attribution data in a data store on the first computing device. Operation 510 is performed by on-device privatization system 116, described above with reference to FIG. 1, FIG. 2, and FIG. 3, or by attribution component 304, described above with reference to FIG. 3, in some implementations.

At operation 512, the processing device determines whether a batch criterion is satisfied. Operation 512 is performed by on-device privatization system 116, described above with reference to FIG. 1, FIG. 2, and FIG. 3, or by event batcher 308, described above with reference to FIG. 3, in some implementations. Determining whether the batch criterion is satisfied includes, for example, determining whether a time interval has expired or determining that a limit on the number of records of multi-party attribution data in the batch has been reached or exceeded. The exact value of the time interval or limit is determined based on design or implementation requirements. The processing device delays the creating of a noisy batch of multi-party attribution data and sending of the noisy batch to a second computing device until after the batch criterion has been satisfied. If the batch criterion is not satisfied, the processing device returns to operation 502 to begin creating a new instance of multi-party attribution data and storing the new instance of multi-party attribution data in the same data store on the first computing device. If the batch criterion is satisfied, the processing device proceeds to operation 514.

At operation 514, the processing device groups the multiple instances of the multi-party attribution data received during the prescribed time interval into a batch. For example, after a predetermined time interval has expired, all of the instances of the multi-party attribution data stored in the data store at the first computing device at that time are grouped together, e.g., as a set of records or a file. Operation 514 is performed by on-device privatization system 116, described above with reference to FIG. 1, FIG. 2, and FIG. 3, or by event batcher 308, described above with reference to FIG. 3, in some implementations.

At operation 516, the processing device adds noise to the compressed format of the labeled third event data in the batch using a differential privacy algorithm. Operation 512 is performed by on-device privatization system 116, described above with reference to FIG. 1, FIG. 2, and FIG. 3, or by privatizer 310, described above with reference to FIG. 3, in some implementations. Operation 516 occurs after operation 514 in the illustrated implementations. In other implementations, the processing device performs operation 516 before operation 514.

At operation 518, the processing device sends the noisy batch of multi-party attribution data to a second computing device.

In some implementations, the processing device applies a debiasing algorithm to the noisy batch of multi-party attribution data before sending the noisy batch to the second computing device. Alternatively or in addition, at least one debiasing algorithm is applied to the noisy batch of multi-party attribution data at the second computing device.

Applying the debiasing algorithm to the noisy batch of multi-party attribution data can include, at the first computing device, (i) receiving, by the first computing device, performance metric data for a content distribution associated with the link, (ii) configuring the debiasing algorithm based on the content distribution performance metric data, and (iii) applying the configured debiasing algorithm to the noisy batch of multi-party attribution data. Alternatively or in addition, applying the debiasing algorithm to the noisy batch of multi-party attribution data can include, at the second computing device, (i) configuring the debiasing algorithm based on performance metric data for a content distribution associated with the link, and (ii) applying the configured debiasing algorithm to the noisy batch of multi-party attribution data.

At the second computing device, the debiased noisy batch of multi-party attribution data can be used to train at least one machine learning model, such as an optimization model, to produce output that can be used to control a content distribution. The output of the at least one trained machine learning model can include an expected conversion rate associated with the user and the content distribution. A content distribution can be controlled by adjusting a value of a parameter of the content distribution based on the expected conversion rate.

In some implementations, performance metric data for the at least one machine learning model is received from the at least one machine learning model, and the debiasing algorithm is configured based on the machine learning model performance metric data.

Applying the debiasing algorithm to the noisy batch of multi-party attribution data can include determining an expected conversion rate associated with the noisy batch of multi-party attribution data, determining a true conversion rate associated with the noisy batch of multi-party attribution data, and based on a comparison of the expected conversion rate to the true conversion rate, removing at least one instance of the multi-party attribution data from the noisy batch of multi-party attribution data.

FIG. 6 is a flow diagram of an example method 600 for on-device privatization in accordance with some embodiments of the present disclosure.

The method 600 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the debiasing system 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 602, the processing device receives, from a first computing device, a noisy batch of multi-party attribution data. Operation 602 is performed by a back end portion of first party application software system 130, described above with reference to FIG. 1, FIG. 2, and FIG. 3, or by debiasing system 132, described above with reference to FIG. 1 and FIG. 2, or by debiaser 312, described above with reference to FIG. 3, in some implementations. The noisy batch of multi-party attribution data is created at the first computing device by, for example, on-device privatization system 116, described above with reference to FIG. 1, FIG. 2, and FIG. 3.

At operation 604, the processing device applies a debiasing algorithm to the noisy batch of multi-party attribution data. Operation 604 is performed by a back end portion of first party application software system 130, described above with reference to FIG. 1, FIG. 2, and FIG. 3, or by debiasing system 132, described above with reference to FIG. 1 and FIG. 2, or by debiaser 312, described above with reference to FIG. 3, in some implementations.

Applying the debiasing algorithm to the noisy batch of multi-party attribution data can include, at the second computing device, (i) configuring the debiasing algorithm based on performance metric data for a content distribution associated with the link, and (ii) applying the configured debiasing algorithm to the noisy batch of multi-party attribution data.

Applying the debiasing algorithm to the noisy batch of multi-party attribution data can include determining an expected conversion rate associated with the noisy batch of multi-party attribution data, determining a true conversion rate associated with the noisy batch of multi-party attribution data; and based on a comparison of the expected conversion rate to the true conversion rate, removing at least one instance of the multi-party attribution data from the noisy batch of multi-party attribution data.

At operation 606, the processing device uses the debiased noisy batch of multi-party attribution data to train at least one machine learning model to produce output that can be used to control a content distribution. Operation 606 is performed by a back end portion of first party application software system 130, described above with reference to FIG. 1, FIG. 2, and FIG. 3, or by optimization model 134, described above with reference to FIG. 1, FIG. 2, and FIG. 3, in some implementations. In some implementations, the processing device receives, from the at least one machine learning model, performance metric data for the at least one machine learning model, and configures the debiasing algorithm based on the machine learning model performance metric data. The output of the at least one trained machine learning model can include an expected conversion rate associated with the user and the content distribution, and the content distribution can be controlled by adjusting a value of a parameter of the content distribution based on the expected conversion rate.

FIG. 7 illustrates an example machine of a computer system 700 within which a set of instructions, for causing the machine to perform any of the methodologies discussed herein, can be executed. In some embodiments, the computer system 700 can correspond to a component of a networked computer system (e.g., the computer system 100 of FIG. 1) that includes, is coupled to, or utilizes a machine to execute an operating system to perform operations corresponding to the on-device privatization system 116, debiasing system 132, and/or optimization model 134 of FIG. 1.

While not specifically shown in FIG. 7, in some implementations, computing system 700 contains on-device privatization system 116 but not debiasing system 132. For example, on-device privatization system 116 is implemented on a user device, and computing system 700 corresponds to that user device, while debiasing system 132 is implemented on a back end system or server. In those implementations, another computing system that contains components similar to those described with respect to computing system 700 contains debiasing system 132. Similarly, in some implementations, computing system 700 contains debiasing system 132 but not on-device privatization system 116. For example, debiasing system 132 is implemented on a back end system or server, and computing system 700 corresponds to that back end system or server, while on-device privatization system 116 is implemented on a user device. In those implementations, another computing system similar to computing system 700 contains on-device privatization system 116. In the implementation illustrated by FIG. 7, computing system 700 contains components of on-device privatization system 116 and debiasing system 132. For example, FIG. 7 illustrates an implementation in which both on-device privatization system 116 and debiasing system 132 are contained on a user device, and computing system 700 represents that user device.

The machine shown in FIG. 7 is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a memory 706 (e.g., flash memory, static random access memory (SRAM), etc.), an input/output system 710, and a data storage system 740, which communicate with each other via a bus 730.

Processing device 702 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be at least one special-purpose processing device such as an application specific integrated circuit (ASIC), a field programmable gate array (FPGA), a digital signal processor (DSP), network processor, or the like. The processing device 702 is configured to execute instructions 712 for performing the operations and steps discussed herein.

Instructions 712 include portions of the on-device privatization system and/or the debiasing system when those portions of the on-device privatization system and/or the debiasing system are being executed by processing device 702. Thus, the on-device privatization system and the debiasing system are shown in dashed lines as part of instructions 712 to illustrate that, at times, portions of the on-device privatization system and/or the debiasing system are executed by processing device 702. For example, when at least some portion of the on-device privatization system and/or the debiasing system is embodied in instructions to cause processing device 702 to perform the method(s) described above, some of those instructions can be read into processing device 702 (e.g., into an internal cache or other memory) from main memory 704 and/or data storage system 740. However, it is not required that all of the on-device privatization system and/or the debiasing system be included in instructions 712 at the same time and portions of the on-device privatization system and/or the debiasing system are stored in at least one other component of computer system 700 at other times, e.g., when at least one portion of the on-device privatization system and/or the debiasing system are not being executed by processing device 702.

The computer system 700 further includes a network interface device 708 to communicate over the network 720. Network interface device 708 provides a two-way data communication coupling to a network. For example, network interface device 708 can be an integrated-services digital network (ISDN) card, cable modem, satellite modem, or a modem to provide a data communication connection to a corresponding type of telephone line. As another example, network interface device 708 can be a local area network (LAN) card to provide a data communication connection to a compatible LAN. Wireless links can also be implemented. In any such implementation network interface device 708 can send and receive electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system 700.

Computer system 700 can send messages and receive data, including program code, through the network(s) and network interface device 708. In the Internet example, a server can transmit a requested code for an application program through the Internet and network interface device 708. The received code can be executed by processing device 702 as it is received, and/or stored in data storage system 740, or other non-volatile storage for later execution.

The input/output system 710 includes an output device, such as a display, for example a liquid crystal display (LCD) or a touchscreen display, for displaying information to a computer user, or a speaker, a haptic device, or another form of output device. The input/output system 710 can include an input device, for example, alphanumeric keys and other keys configured for communicating information and command selections to processing device 702. An input device can, alternatively or in addition, include a cursor control, such as a mouse, a trackball, or cursor direction keys for communicating direction information and command selections to processing device 702 and for controlling cursor movement on a display. An input device can, alternatively or in addition, include a microphone, a sensor, or an array of sensors, for communicating sensed information to processing device 702. Sensed information can include voice commands, audio signals, geographic location information, and/or digital imagery, for example.

The data storage system 740 includes a machine-readable storage medium 742 (also known as a computer-readable medium) on which is stored at least one set of instructions 744 or software embodying any of the methodologies or functions described herein. The instructions 744 can also reside, completely or at least partially, within the main memory 704 and/or within the processing device 702 during execution thereof by the computer system 700, the main memory 704 and the processing device 702 also constituting machine-readable storage media.

In one embodiment, the instructions 744 include instructions to implement functionality corresponding to an on-device privatization system and/or a debiasing system (e.g., the on-device privatization system 116 and/or the debiasing system 132 of FIG. 1).

Dashed lines are used in FIG. 7 to indicate that it is not required that the on-device privatization system and/or the debiasing system be embodied entirely in instructions 712, 714, and 744 at the same time. In one example, portions of the on-device privatization system and/or the debiasing system are embodied in instructions 744, which are read into main memory 704 as instructions 714, and portions of instructions 714 are read into processing device 702 as instructions 712 for execution. In another example, some portions of the on-device privatization system and/or the debiasing system are embodied in instructions 744 while other portions are embodied in instructions 714 and still other portions are embodied in instructions 712.

While the machine-readable storage medium 742 is shown in an example embodiment to be a single medium, the term "machine-readable storage medium" should be taken to include a single medium or multiple media that store at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the above-described computer-implemented methods 200, 300, 500, 600, in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes at a first computing device associated with a user, (i) receiving and storing on the first computing device, first event data associated with a login to a first party application, (ii) receiving and storing on the first computing device, second event data representing a click, in the first party application, on a link to a third party application, (iii) receiving and storing on the first computing device, third event data from the third party application, (iv) converting the third event data to a label selected from a set of available labels that are each represented by a compressed format including at least one bit, (v) mapping the compressed format of the labeled third event data to the first event data and the second event data to create an instance of multi-party attribution data, (vi) grouping multiple instances of the multi-party attribution data into a batch, (vii) adding noise to the compressed format of the labeled third event data in the batch using a differentially private algorithm, and (viii) sending the noisy batch of multi-party attribution data to a second computing device; applying a debiasing algorithm to the noisy batch of multi-party attribution data; and at a second computing device, using the debiased noisy batch of multi-party attribution data to train at least one machine learning model to produce output that can be used to control a content distribution.

An example 2 includes the subject matter of example 1, where the first event data includes an identifier associated with the user's use of the first party application and the third event data indicates whether a conversion occurred in the third party application in response to the click on the link to the third party application. An example 3 includes the subject matter of example 1 or example 2, where converting the third event data to a label includes: mapping the third event data to a 1 bit when the third event data indicates that a conversion occurred in the third party application in response to the click on the link to the third party application; and mapping the third event data to a 0 bit when the third event data does not indicate that the conversion occurred. An example 4 includes the subject matter of any of examples 1-3, where converting the third event data to a label includes: mapping the third event data to a first bit when the third event data indicates that a conversion of a first type occurred in the third party application in response to the click on the link to the third party application; and mapping the third event data to a second bit different from the first bit when the third event data indicates that a conversion of a second type different from the first type occurred in the third party application in response to the click on the link to the third party application. An example 5 includes the subject matter of any of examples 1-4, where applying the debiasing algorithm to the noisy batch of multi-party attribution data includes, at the first computing device, (i) receiving, by the first computing device, performance metric data for a content distribution associated with the link, (ii) configuring the debiasing algorithm based on the content distribution performance metric data, and (iii) applying the configured debiasing algorithm to the noisy batch of multi-party attribution data. An example 6 includes the subject matter of any of examples 1-5, where applying the debiasing algorithm to the noisy batch of multi-party attribution data includes, at the second computing device, (i) configuring the debiasing algorithm based on performance metric data for a content distribution associated with the link, and (ii) applying the configured debiasing algorithm to the noisy batch of multi-party attribution data. An example 7 includes the subject matter of any of examples 1-6, further including: receiving, from the at least one machine learning model, performance metric data for the at least one machine learning model; and configuring the debiasing algorithm based on the machine learning model performance metric data. An example 8 includes the subject matter of any of examples 1-7, further including: delaying the sending of the noisy batch of multi-party attribution data to the second computing device until after a batch criterion has been satisfied. An example 9 includes the subject matter of any of examples 1-8, where applying the debiasing algorithm to the noisy batch of multi-party attribution data includes: determining an expected conversion rate associated with the noisy batch of multi-party attribution data; determining a true conversion rate associated with the noisy batch of multi-party attribution data; and based on a comparison of the expected conversion rate to the true conversion rate, removing at least one instance of the multi-party attribution data from the noisy batch of multi-party attribution data. An example 10 includes the subject matter of any of examples 1-9, where the output of the at least one trained machine learning model includes an expected conversion rate associated with the user and the content distribution; and the method further includes controlling the content distribution by adjusting a value of a parameter of the content distribution based on the expected conversion rate.

In an example 11, a system includes: at least one memory; and at least one processor coupled to the at least one memory; where the at least one memory includes instructions, that when executed by the at least one processor, cause the at least one processor to perform operations including, at a first computing device associated with a user: receiving and storing, first event data associated with a login to a first party application; receiving and storing second event data representing a click, in the first party application, on a link to a third party application; receiving third event data from the third party application; converting the third event data to a label selected from a set of available labels that are each represented by a compressed format including at least one bit; mapping the compressed format of the labeled third event data to the first event data and the second event data to create an instance of multi-party attribution data; grouping multiple instances of the multi-party attribution data into a batch; adding noise to the compressed format of the labeled third event data in the batch using a differential privacy algorithm; and sending the noisy batch of multi-party attribution data to a second computing device configured to train at least one machine learning model to produce output that can be used to control a content distribution. An example 12 includes the subject matter of example 11, where the first event data includes an identifier associated with the user's use of the first party application and the third event data indicates whether a conversion occurred in the third party application in response to the click on the link to the third party application. An example 13 includes the subject matter of example 11 or example 12, where converting the third event data to a label includes: mapping the third event data to a 1 bit when the third event data indicates that a conversion occurred in the third party application in response to the click on the link to the third party application; and mapping the third event data to a 0 bit when the third event data does not indicate that the conversion occurred. An example 14 includes the subject matter of any of examples 11-13, where converting the third event data to a label includes: mapping the third event data to a first bit when the third event data indicates that a conversion of a first type occurred in the third party application in response to the click on the link to the third party application; and mapping the third event data to a second bit different from the first bit when the third event data indicates that a conversion of a second type different from the first type occurred in the third party application in response to the click on the link to the third party application. An example 15 includes the subject matter of any of examples 11-14, where the output of the at least one trained machine learning model includes an expected conversion rate associated with the user and the content distribution; and the method further includes controlling the content distribution by adjusting a value of a parameter of the content distribution based on the expected conversion rate. An example 16 includes the subject matter of any of examples 11-14, further including: delaying the sending of the noisy batch of multi-party attribution data to the second computing device until after a batch criterion has been satisfied.

In an example 17, a method includes: receiving, from a first computing device, a noisy batch of multi-party attribution data; where the noisy batch of multi-party attribution data includes first event data associated with a login to a first party application, second event data representing a click, in the first party application, on a link to a third party application, and noisy third event data created by applying a differential privacy algorithm to third event data generated by the third party application; applying a debiasing algorithm to the noisy batch of multi-party attribution data; and using the debiased noisy batch of multi-party attribution data to train at least one machine learning model to produce output that can be used to control a content distribution.

An example 18 includes the subject matter of example 17, where applying the debiasing algorithm to the noisy batch of multi-party attribution data includes: configuring the debiasing algorithm based on performance metric data for a content distribution associated with the link; and applying the configured debiasing algorithm to the noisy batch of multi-party attribution data. An example 19 includes the subject matter of example 17 or example 18, where applying the debiasing algorithm to the noisy batch of multi-party attribution data includes: determining an expected conversion rate associated with the noisy batch of multi-party attribution data; determining a true conversion rate associated with the noisy batch of multi-party attribution data; and based on a comparison of the expected conversion rate to the true conversion rate, removing at least one instance of the multi-party attribution data from the noisy batch of multi-party attribution data. An example 20 includes the subject matter of any of examples 17-19, where the output of the at least one trained machine learning model includes an expected conversion rate associated with a user and the content distribution; and the method further includes controlling the content distribution by adjusting a value of a parameter of the content distribution based on the expected conversion rate.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
at a first computing device associated with a user, (i) receiving and storing on the first computing device, first event data associated with a login to a first party application, (ii) receiving and storing on the first computing device, second event data representing a click, in the first party application, on a link to a third party application, (iii) receiving and storing on the first computing device, third event data from the third party application, (iv) converting the third event data to a label selected from a set of available labels that are each represented by a compressed format comprising at least one bit, (v) mapping the compressed format of the labeled third event data to the first event data and the second event data to create an instance of multi-party attribution data, (vi) grouping multiple instances of the multi-party attribution data into a batch, (vii) adding noise to the compressed format of the labeled third event data in the batch using a differentially private algorithm, and (viii) sending the noisy batch of multi-party attribution data to a second computing device;
applying a debiasing algorithm to the noisy batch of multi-party attribution data; and
at a second computing device, using the debiased noisy batch of multi-party attribution data to train at least one machine learning model to produce output that can be used to control a content distribution.

2. The method of claim 1, wherein the first event data comprises an identifier associated with the user's use of the first party application and the third event data indicates whether a conversion occurred in the third party application in response to the click on the link to the third party application.

3. The method of claim 1, wherein converting the third event data to a label comprises:
mapping the third event data to a 1 bit when the third event data indicates that a conversion occurred in the third party application in response to the click on the link to the third party application; and
mapping the third event data to a 0 bit when the third event data does not indicate that the conversion occurred.

4. The method of claim 1, wherein converting the third event data to a label comprises:
mapping the third event data to a first bit when the third event data indicates that a conversion of a first type occurred in the third party application in response to the click on the link to the third party application; and
mapping the third event data to a second bit different from the first bit when the third event data indicates that a conversion of a second type different from the first type occurred in the third party application in response to the click on the link to the third party application.

5. The method of claim 1, wherein applying the debiasing algorithm to the noisy batch of multi-party attribution data comprises, at the first computing device, (i) receiving, by the first computing device, performance metric data for a content distribution associated with the link, (ii) configuring the debiasing algorithm based on the content distribution performance metric data, and (iii) applying the configured debiasing algorithm to the noisy batch of multi-party attribution data.

6. The method of claim 1, wherein applying the debiasing algorithm to the noisy batch of multi-party attribution data comprises, at the second computing device, (i) configuring the debiasing algorithm based on performance metric data for a content distribution associated with the link, and (ii) applying the configured debiasing algorithm to the noisy batch of multi-party attribution data.

7. The method of claim 1, further comprising:
receiving, from the at least one machine learning model, performance metric data for the at least one machine learning model; and
configuring the debiasing algorithm based on the machine learning model performance metric data.

8. The method of claim 1, further comprising:
delaying the sending of the noisy batch of multi-party attribution data to the second computing device until after a batch criterion has been satisfied.

9. The method of claim 1, wherein applying the debiasing algorithm to the noisy batch of multi-party attribution data comprises:
determining an expected conversion rate associated with the noisy batch of multi-party attribution data;
determining a true conversion rate associated with the noisy batch of multi-party attribution data; and
based on a comparison of the expected conversion rate to the true conversion rate, removing at least one instance of the multi-party attribution data from the noisy batch of multi-party attribution data.

10. The method of claim 1, wherein the output of the at least one trained machine learning model comprises an expected conversion rate associated with the user and the content distribution; and the method further comprises controlling the content distribution by adjusting a value of a parameter of the content distribution based on the expected conversion rate.

11. A system comprising:
a processor; and
a memory, wherein the memory comprises instructions that when executed by the processor cause the processor to:
at a first computing device associated with a user, (i) receive and store on the first computing device, first event data associated with a login to a first party application, (ii) receive and store on the first computing device, second event data representing a click, in the first party application, on a link to a third party application, (iii) receive and store on the first computing device, third event data from the third party application, (iv) convert the third event data to a label selected from a set of available labels that are each represented by a compressed format comprising at least one bit, (v) map the compressed format of the labeled third event data to the first event data and the second event data to create an instance of multi-party attribution data, (vi) group multiple instances of the multi-party attribution data into a batch, (vii) add noise to the compressed format of the labeled third event data in the batch using a differentially private algorithm, and (viii) send the noisy batch of multi-party attribution data to a second computing device;
apply a debiasing algorithm to the noisy batch of multi-party attribution data; and
at a second computing device, use the debiased noisy batch of multi-party attribution data to train at least one machine learning model to produce output that can be used to control a content distribution.

12. The system of claim 11, wherein the first event data comprises an identifier associated with the user's use of the first party application and the third event data indicates whether a conversion occurred in the third party application in response to the click on the link to the third party application.

13. The system of claim 11, wherein the instructions further cause the processor to convert the third event data to a label by:
mapping the third event data to a 1 bit when the third event data indicates that a conversion occurred in the third party application in response to the click on the link to the third party application; and
mapping the third event data to a 0 bit when the third event data does not indicate that the conversion occurred.

14. The system of claim 11, wherein the instructions further cause the processor to convert the third event data to a label by:
mapping the third event data to a first bit when the third event data indicates that a conversion of a first type occurred in the third party application in response to the click on the link to the third party application; and
mapping the third event data to a second bit different from the first bit when the third event data indicates that a conversion of a second type different from the first type occurred in the third party application in response to the click on the link to the third party application.

15. The system of claim 11, wherein the instructions further cause the processor to apply the debiasing algorithm to the noisy batch of multi-party attribution data by, at the first computing device, (i) receiving, by the first computing device, performance metric data for a content distribution associated with the link, (ii) configuring the debiasing algorithm based on the content distribution performance metric data, and (iii) applying the configured debiasing algorithm to the noisy batch of multi-party attribution data.

16. The system of claim 11, wherein the instructions further cause the processor to apply the debiasing algorithm to the noisy batch of multi-party attribution data by, at the second computing device, (i) configuring the debiasing algorithm based on performance metric data for a content distribution associated with the link, and (ii) applying the configured debiasing algorithm to the noisy batch of multi-party attribution data.

17. The system of claim 11, wherein the instructions further cause the processor to:
receive, from the at least one machine learning model, performance metric data for the at least one machine learning model; and
configure the debiasing algorithm based on the machine learning model performance metric data.

18. The system of claim 11, wherein the instructions further cause the processor to:
delay the sending of the noisy batch of multi-party attribution data to the second computing device until after a batch criterion has been satisfied.

19. The system of claim 11, wherein the instructions further cause the processor to apply the debiasing algorithm to the noisy batch of multi-party attribution data by:
determining an expected conversion rate associated with the noisy batch of multi-party attribution data;
determining a true conversion rate associated with the noisy batch of multi-party attribution data; and
based on a comparison of the expected conversion rate to the true conversion rate, removing at least one instance of the multi-party attribution data from the noisy batch of multi-party attribution data.

20. The system of claim 11, wherein the output of the at least one trained machine learning model comprises an expected conversion rate associated with the user and the content distribution; and the instructions further cause the processor to control the content distribution by adjusting a value of a parameter of the content distribution based on the expected conversion rate.

* * * * *